United States Patent
Smalley et al.

(10) Patent No.: US 12,491,902 B2
(45) Date of Patent: Dec. 9, 2025

(54) TRAILER SWAY DETECTION AND CONTROL

(71) Applicant: Toyota Motor Engineering & Manufacturing North America, Inc., Plano, TX (US)

(72) Inventors: Christopher J. Smalley, Canton, MI (US); Steven W. Marion, Canton, MI (US); Brian J. Haugen, Saline, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 130 days.

(21) Appl. No.: 18/490,938

(22) Filed: Oct. 20, 2023

(65) Prior Publication Data

US 2025/0128723 A1 Apr. 24, 2025

(51) Int. Cl.
| | |
|---|---|
| *B60W 50/14* | (2020.01) |
| *B60W 30/02* | (2012.01) |
| *B60W 30/18* | (2012.01) |
| *B62D 53/04* | (2006.01) |
| *B62D 53/00* | (2006.01) |

(52) U.S. Cl.
CPC ............ *B60W 50/14* (2013.01); *B60W 30/02* (2013.01); *B60W 30/18163* (2013.01); *B60W 2050/143* (2013.01); *B60W 2520/125* (2013.01); *B60W 2520/14* (2013.01); *B62D 53/00* (2013.01); *B62D 53/04* (2013.01)

(58) Field of Classification Search
CPC ................ B60W 50/14; B60W 30/02; B60W 30/18163; B60W 2050/143; B60W 2520/125; B60W 2520/14; B62D 53/00; B62D 53/04; B60T 8/17551; B60T 8/1708; B60T 8/171; B60T 2230/06; G06T 7/73; G06T 2207/30252; H04N 23/695

See application file for complete search history.

(56) References Cited

U.S. PATENT DOCUMENTS

| | | | |
|---|---|---|---|
| 8,700,282 | B2 | 4/2014 | Nishio et al. |
| 8,740,317 | B2 | 6/2014 | Wu et al. |
| 10,384,501 | B2 | 8/2019 | Rothschild |
| 10,994,709 | B2 | 5/2021 | Nemeth et al. |
| 11,498,536 | B2 | 11/2022 | VanAntwerp et al. |
| 2019/0001944 | A1 | 1/2019 | Ying et al. |
| 2022/0084212 | A1* | 3/2022 | Dahal ...................... G06N 3/08 |
| 2022/0126917 | A1 | 4/2022 | Helfrich et al. |
| 2023/0137098 | A1* | 5/2023 | Miao ..................... B60T 8/1708 701/70 |
| 2024/0132054 | A1* | 4/2024 | Weston .................. B60W 30/02 |
| 2025/0050849 | A1* | 2/2025 | Hayes .................... B60T 8/171 |

* cited by examiner

*Primary Examiner* — Ashley L Redhead, Jr.
(74) *Attorney, Agent, or Firm* — Christopher G. Darrow; Darrow Mustafa PC (57) ABSTRACT

System, methods, and other embodiments are described with respect to implementing trailer sway detection strategies. In one embodiment, a method includes receiving a lateral motion signal, determining if a number of peaks in the lateral motion signal satisfies a first criterion, determining if a cross-correlation of yaw acceleration and lateral acceleration satisfies a second criterion, disabling lane keeping assistance if the first criterion is satisfied, and determining if a trailer sway event is in progress if the first criterion and second criterion are satisfied.

20 Claims, 5 Drawing Sheets

TRAILER SWAY DETECTION AND CONTROL

TECHNICAL FIELD

The subject matter described herein relates, in general, to strategies for detecting trailer sway, and, more particularly, to implementing a response based on trailer sway detection.

BACKGROUND

Trailer sway, also known as fishtailing or trailer oscillation, refers to the lateral movement or instability of a trailer being towed behind a vehicle. This phenomenon typically occurs when a trailer starts to move side to side in a swaying motion, hence the term "trailer sway". Trailer sway can be caused by various factors, including improper loading, strong winds, high speed, uneven tire pressure, tongue weight, suspension and trailer design, sudden steering inputs, hard or uneven braking, poor road conditions, and so on. Trailer sway left uncorrected can cause loss of control of the trailer as well as the towing vehicle.

SUMMARY

In one embodiment, a trailer sway detection system is disclosed. The vehicle management system includes one or more processors and a memory communicably coupled to the one or more processors. The memory stores a command module including instructions that when executed by the one or more processors cause the one or more processors to receive a lateral motion signal; determine if a number of peaks in the lateral motion signal satisfies a first criterion; determine if a cross-correlation of yaw acceleration and lateral acceleration satisfies a second criterion; disable lane keeping assistance if the first criterion is satisfied; and determine if a trailer sway event is in progress if the first criterion and second criterion are satisfied.

In one embodiment, a non-transitory computer-readable medium including instructions that when executed by one or more processors cause the one or more processors to perform one or more functions is disclosed. The instructions include instructions to receive a lateral motion signal; determine if a number of peaks in the lateral motion signal satisfies a first criterion; determine if a cross-correlation of yaw acceleration and lateral acceleration satisfies a second criterion; disable lane keeping assistance if the first criterion is satisfied; and determine if a trailer sway event is in progress if the first criterion and second criterion are satisfied.

In one embodiment, a method for implementing trailer sway detection strategies is disclosed. In one embodiment, the method includes receiving a lateral motion signal; determining if a number of peaks in the lateral motion signal satisfies a first criterion; determining if a cross-correlation of yaw acceleration and lateral acceleration satisfies a second criterion; disabling lane keeping assistance if the first criterion is satisfied; and determining if a trailer sway event is in progress if the first criterion and second criterion are satisfied.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with trailer sway detection are described herein. Trailer sway may cause a loss of control to a vehicle, its trailer, or both when it occurs. In order to prevent trailer sway from occurring, it is beneficial to not only detect trailer sway as early as possible, but also prepare the driver to handle trailer sway before it becomes an urgent emergency event.

Trailer sway may cause oscillations in the lateral motion of a vehicle. In addition, they may cause the yaw acceleration and lateral acceleration of a vehicle to go out of phase. Accordingly, detecting a number of peak oscillations within a time period of a bandpass filtered lateral motion signal may allow for early detection of a possible trailer sway event. When that occurs, lane keeping assistance may be disabled even if trailer sway has only begun to make a presence felt on a vehicle. If the cross-correlation of the yaw acceleration and lateral acceleration falls below a threshold, the vehicle may determine that a trailer sway event is in progress. If a trailer sway event is in progress, additional response actions may be taken by the vehicle, such as notifying the driver that a trailer sway event is occurring and implementing further control actions on the vehicle.

Figure 1:
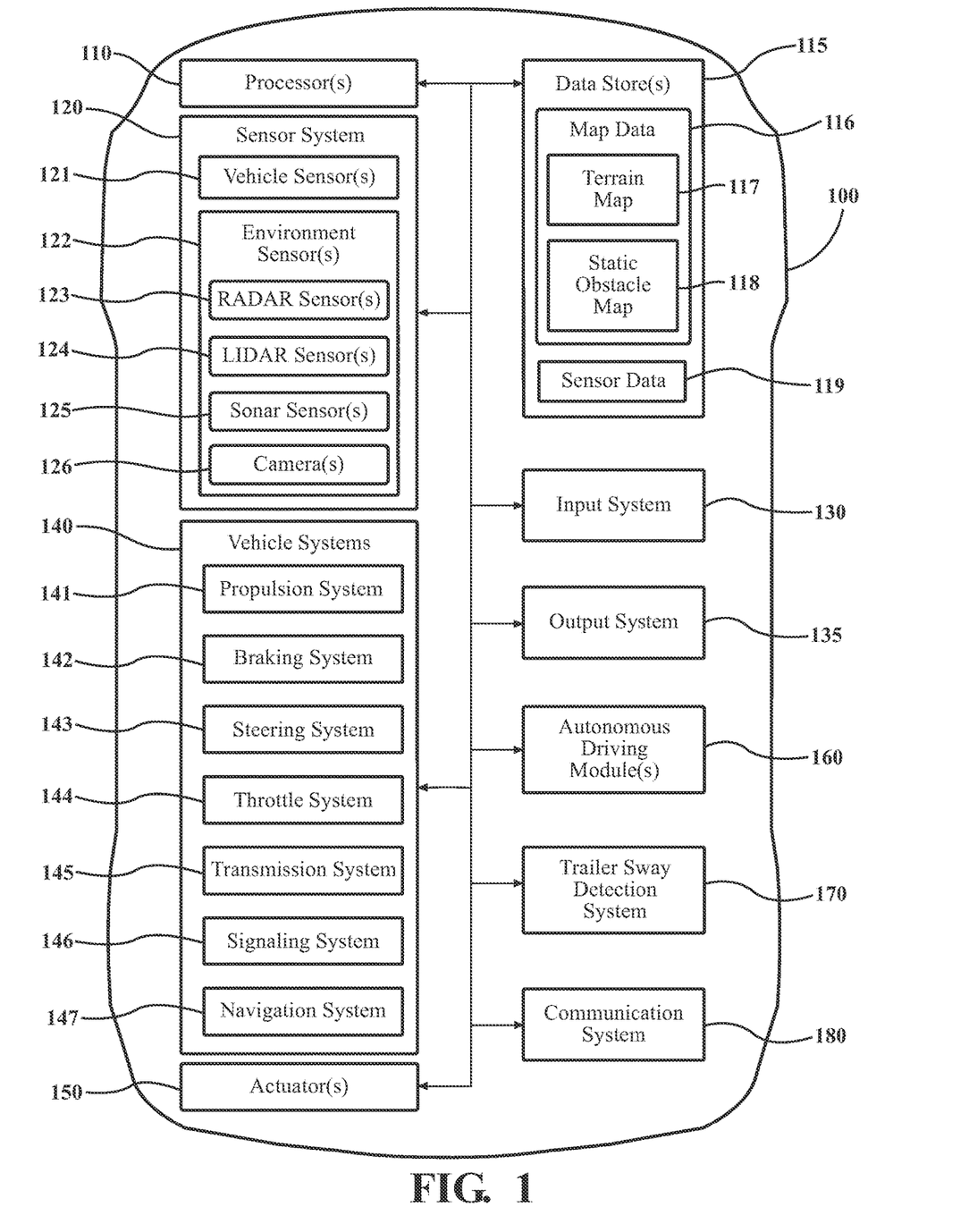
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, vehicle 100 is an automobile. While arrangements will be described herein with respect to automobiles, it will be understood that embodiments are not limited to automobiles. In some implementations, vehicle 100 may be any robotic device or form of motorized transport that, for example, includes sensors to perceive aspects of the surrounding environment, and thus benefits from the functionality discussed herein associated with trailer sway detection strategies. As a further note, this disclosure generally discusses vehicle 100 as traveling on a roadway with surrounding vehicles, which are intended to be construed in a similar manner as vehicle 100 itself. That is, the surrounding vehicles may include any vehicle that may be encountered on a roadway by vehicle 100.

Vehicle 100 also includes various elements. It will be understood that in various embodiments it may not be necessary for vehicle 100 to have all of the elements shown in FIG. 1. Vehicle 100 may have any combination of the various elements shown in FIG. 1. Further, vehicle 100 may have additional elements to those shown in FIG. 1. In some arrangements, vehicle 100 may be implemented without one or more of the elements shown in FIG. 1. While the various elements are shown as being located within vehicle 100 in FIG. 1, it will be understood that one or more of these elements may be located external to vehicle 100. Further, the elements shown may be physically separated by large distances. For example, as discussed, one or more components of the disclosed system may be implemented within a vehicle while further components of the system are implemented within a cloud-computing environment or other system that is remote from vehicle 100.

Some of the possible elements of vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, vehicle 100 includes a trailer sway detection system 170 that is implemented to perform methods and other functions as disclosed herein relating to implementing trailer sway detection strategies. As will be discussed in greater detail subsequently, trailer sway detection system 170, in various embodiments, is implemented partially within vehicle 100 and as a cloud-based service. For example, in one approach, functionality associated with at least one module of trailer sway detection system 170 is implemented within vehicle 100 while further functionality is implemented within a cloud-based computing system.

Figure 2:
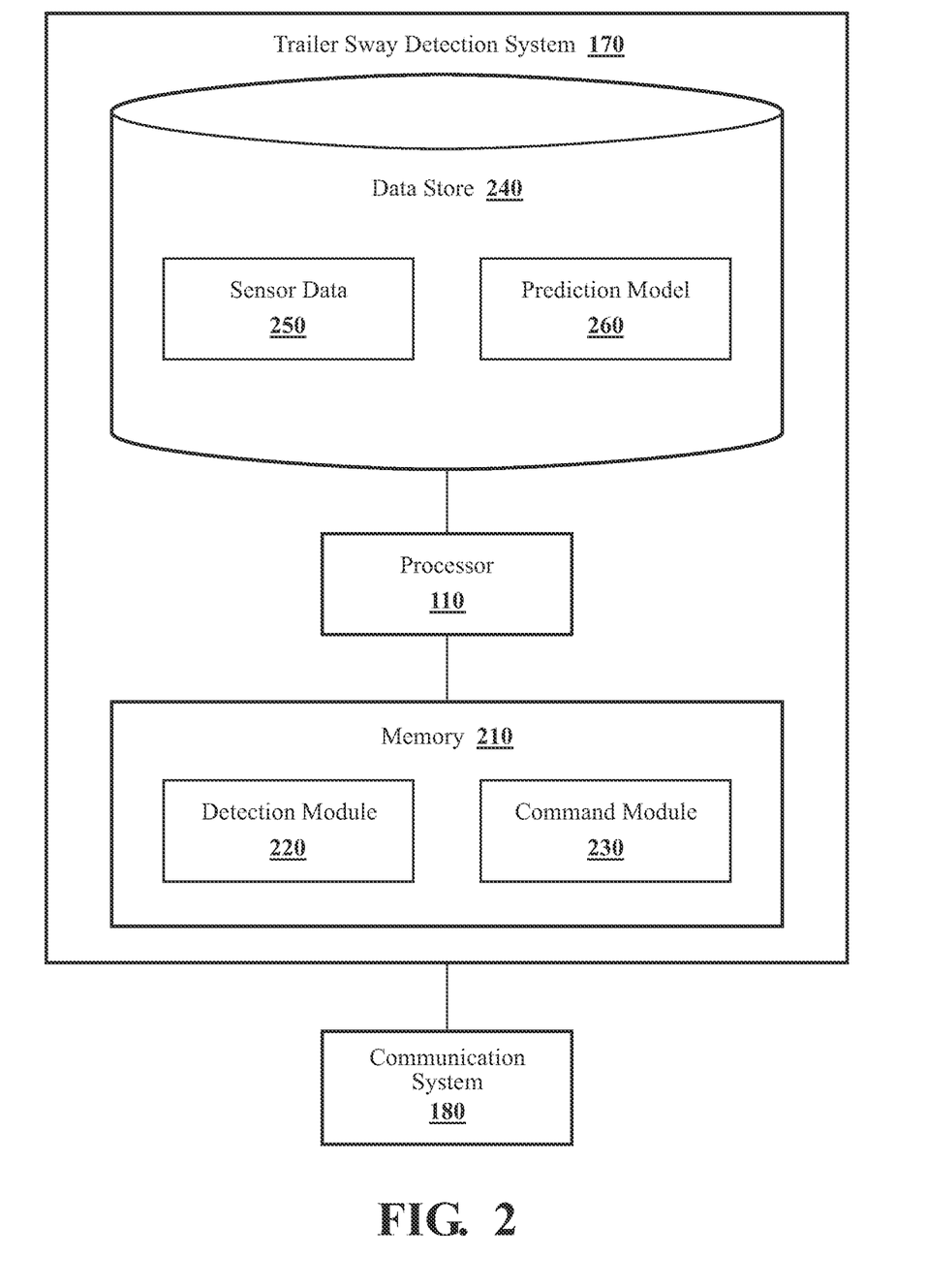
FIG. 2 illustrates one embodiment of a trailer sway detection system that is associated with implementing trailer sway detection strategies.

With reference to FIG. 2, one embodiment of trailer sway detection system 170 of FIG. 1 is further illustrated. Trailer sway detection system 170 is shown as including processor(s) 110 from vehicle 100 of FIG. 1. Accordingly, processor(s) 110 may be a part of trailer sway detection system 170, trailer sway detection system 170 may include a separate processor from processor 110(s) of vehicle 100, or trailer sway detection system 170 may access processor 110(s) through a data bus or another communication path. In one embodiment, trailer sway detection system 170 includes memory 210, which stores detection module 220 and command module 230. Memory 210 is a random-access memory (RAM), read-only memory (ROM), a hard-disk drive, a flash memory, or other suitable memory for storing detection module 220 and command module 230. Detection module 220 and command module 230 are, for example, computer-readable instructions that when executed by processor(s) 110 cause processor(s) 110 to perform the various functions disclosed herein.

Trailer sway detection system 170 as illustrated in FIG. 2 is generally an abstracted form of trailer sway detection system 170 as may be implemented between vehicle 100 and a cloud-computing environment. Accordingly, trailer sway detection system 170 may be embodied at least in part within a cloud-computing environment to perform the methods described herein.

With reference to FIG. 2, detection module 220 generally includes instructions that function to control processor(s) 110 to receive data inputs from one or more sensors of vehicle 100. The inputs are, in one embodiment, observations of one or more objects in an environment proximate to vehicle 100, other aspects about the surroundings, or both. As provided for herein, detection module 220, in one embodiment, acquires sensor data 250 that includes at least camera images. In further arrangements, detection module 220 acquires sensor data 250 from further sensors such as radar 123, LiDAR 124, and other sensors as may be suitable for identifying vehicles, locations of the vehicles, lane markers, crosswalks, traffic signs, vehicle parking areas, road surface types, curbs, vehicle barriers, and so on. In one embodiment, detection module 220 may also acquire sensor data 250 from one or more sensors that allow for implementing trailer sway detection strategies.

Accordingly, detection module 220, in one embodiment, controls the respective sensors to provide sensor data 250. Additionally, while detection module 220 is discussed as controlling the various sensors to provide sensor data 250, in one or more embodiments, detection module 220 may employ other techniques to acquire sensor data 250 that are either active or passive. For example, detection module 220 may passively sniff sensor data 250 from a stream of electronic information provided by the various sensors to further components within vehicle 100. Moreover, detection module 220 may undertake various approaches to fuse data from multiple sensors when providing sensor data 250, from sensor data acquired over a wireless communication link (e.g., v2v) from one or more of the surrounding vehicles, or from a combination thereof. Thus, sensor data 250, in one embodiment, represents a combination of perceptions acquired from multiple sensors.

In addition to locations of surrounding vehicles, sensor data 250 may also include, for example, odometry information, GPS data, or other location data. Moreover, detection module 220, in one embodiment, controls the sensors to acquire sensor data about an area that encompasses 360 degrees about vehicle 100, which may then be stored in sensor data 250. In some embodiments, such area sensor data may be used to provide a comprehensive assessment of the surrounding environment around vehicle 100. Of course, in alternative embodiments, detection module 220 may acquire the sensor data about a forward direction alone when, for example, vehicle 100 is not equipped with further sensors to include additional regions about the vehicle or the additional regions are not scanned due to other reasons (e.g., unnecessary due to known current conditions).

Moreover, in one embodiment, trailer sway detection system 170 includes a database 240. Database 240 is, in one embodiment, an electronic data structure stored in memory 210 or another data store and that is configured with routines that may be executed by processor(s) 110 for analyzing stored data, providing stored data, organizing stored data, and so on. Thus, in one embodiment, database 240 stores data used by the detection module 220 and command module 230 in executing various functions. In one embodiment, database 240 includes sensor data 250 along with, for example, metadata that characterize various aspects of sensor data 250. For example, the metadata may include location coordinates (e.g., longitude and latitude), relative map coordinates or tile identifiers, time/date stamps from when separate sensor data 250 was generated, and so on.

Detection module 220, in one embodiment, is further configured to perform additional tasks beyond controlling the respective sensors to acquire and provide sensor data 250. For example, detection module 220 includes instructions that may cause processor(s) 110 to form a vehicle/trailer data package using data such as a lateral motion signal, steering signals, lateral acceleration, vehicle speed, vehicle constants, lane keeping assistance status, trailer hitch angle, and so on that may be stored in sensor data 250. Such information may be comprised of timestamps, pose/orientation/location of the camera or vehicle, camera images, remote surveillance data (e.g., from a drone, infrastructure devices, satellite), or other data useful for detecting trailer sway. In some embodiments, detection module 220 may provide a lateral motion signal in the form of a yaw rate signal from a yaw rate sensor. In some embodiments, detection module 220 may provide a lateral motion signal based on other sensor data, such as if a yaw rate sensor is not present or defective. For example, detection module 220 may use data regarding lateral offset from center, lateral acceleration, yaw angle, yaw acceleration, etc. to provide a lateral motion signal. As another example, detection module 220 may provide a lateral motion signal using data from a potentiometer or other force sensor measuring lateral forces at a trailer hitch. In some embodiments, detection module 220 may process a lateral motion signal using a bandpass filter to isolate a particular range of frequencies for analysis while suppressing others.

Figure 3A:
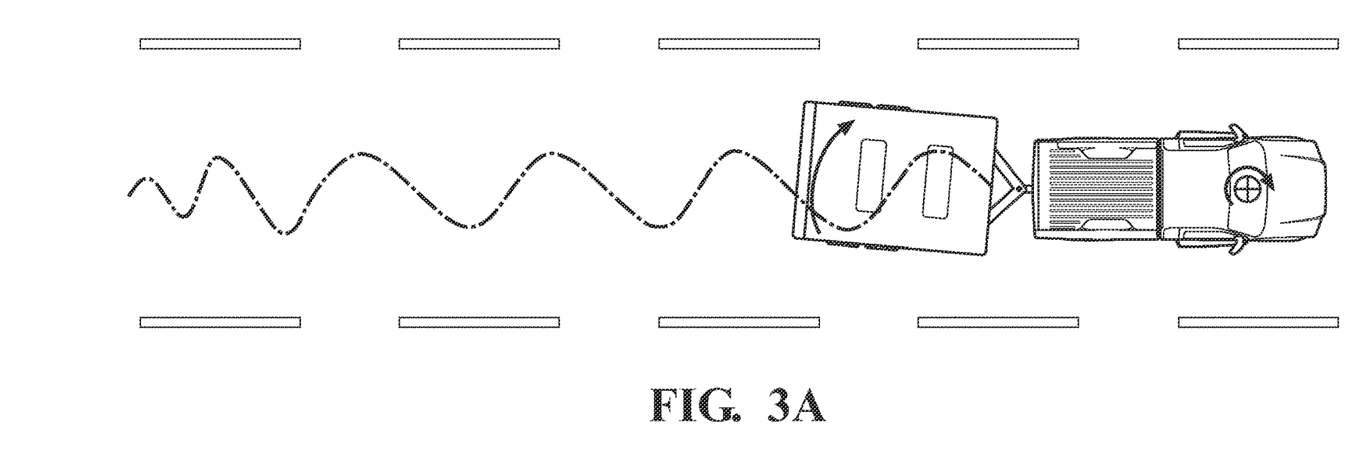
FIG. 3A illustrates one example of a trailer sway event.
Figure 3B:
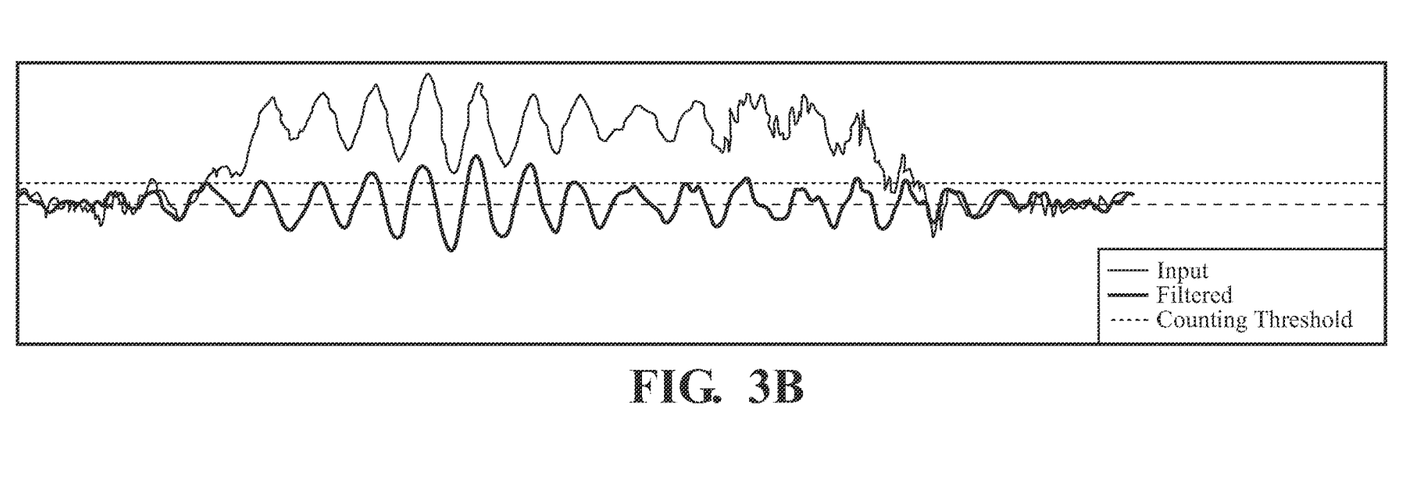
FIG. 3B illustrates one example of lateral motion signals involving a trailer sway event.

In some embodiments, command module 230 may receive a lateral motion signal for vehicle 100 (e.g., via sensor data 250). When oscillations in the lateral motion signal occur (e.g., due to a trailer sway event as shown in FIG. 3A), command module 230 may determine if a trailer sway event is in progress. For example, a trailer sway event with respect to a lateral motion signal is shown in FIG. 3B, where both an unfiltered and a bandpass filtered lateral motion signal are shown. In such an example, the lateral motion is without oscillations of concern, then a trailer sway event causes the lateral motion signal to oscillate with increasing magnitude from peak to peak, and then after the trailer sway event ends the oscillations subside.

In evaluating whether a trailer sway event has begun, command module 230 may require a minimum number of oscillations to have occurred. For instance, command module 230 may use a lateral motion oscillation counter to measure the number of oscillations within a pre-determined time period (e.g., 1.5s). If the lateral motion oscillation counter does not exceed a pre-determined threshold (e.g., 3), then command module 230 may determine that a trailer sway event is not in progress. If the lateral motion oscillation counter exceeds the pre-determined threshold, command module 230 may evaluate further factors to determine if a trailer sway event is in progress. In some embodiments, command module 230 may only count an oscillation if the peak of the oscillation is above a counting threshold (e.g., as shown in FIG. 3B).

Figure 4:
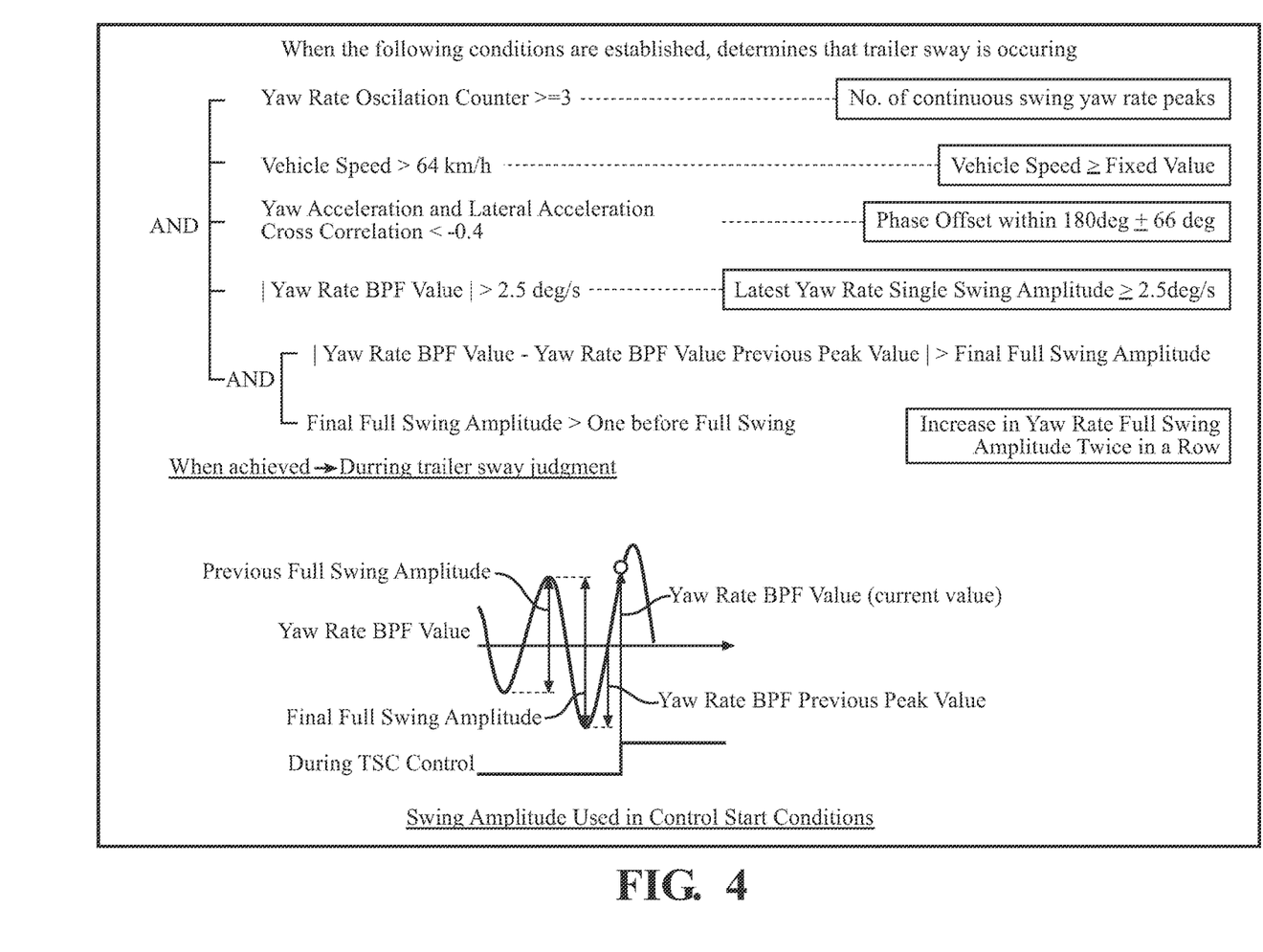
FIG. 4 illustrates one example of an approach for determining if a trailer sway event is occurring.

For example, command module 230 may require that the vehicle speed of vehicle 100 satisfy a pre-determined criterion (e.g., more than 40 mph) for a trailer sway event to be deemed in progress. As another example, command module 230 may require that the cross correlation of the yaw acceleration and lateral acceleration of vehicle 100 satisfy a pre-determined criterion (e.g., less than −0.4) for a trailer sway event to be deemed in progress. As another example, command module 230 may require that the latest lateral motion single swing amplitude satisfy a pre-determined criterion (e.g., equal to or more than 2.5 degrees/s) for a trailer sway event to be deemed in progress. As another example, command module 230 may require that the peak magnitude of the most recent oscillation is greater than the prior peak oscillation for a trailer sway event to be deemed in progress. An example of such factors being used by command module 230 to determine if a trailer sway event is in progress is shown in FIG. 4. Once a trailer sway event is in progress, command module 230 may disable lane keeping assistance. In some embodiments, command module 230 may also disable automated driving assistance (ADAS) functions, such as collision avoidance, lane departure warning, blind-spot detection, and automatic emergency braking.

In one embodiment, command module 230 may count the number of peaks in a lateral motion signal within a pre-determined period of time (e.g., 1.5s). If the number of peaks counter satisfies a criterion (e.g., more than 3) and lane keeping assistance is not enabled, then command module 230 may suppress activation of lane keeping assistance until the number of peaks no longer satisfies the criterion. Similarly, if the number of peaks counter satisfies a criterion (e.g., more than 3) and lane keeping assistance is enabled, then command module 230 may disable lane keeping assistance until the number of peaks no longer satisfies the criterion. For example, if no additional peaks are detected within the pre-determined period of time after the criterion was satisfied, then the number of peaks counter may be set to zero. As another example, the number of peaks counter may be based on a sliding window of time, such that the number of peaks increases or decreases based on the number of peaks in the lateral motion signal within the sliding window. In some embodiments, when the number of peaks counter is found to no longer satisfy the criterion, command module 230 may nonetheless impose a pre-determined delay (e.g., 5s) before availability of lane keeping assistance is restored. In some embodiments, once the availability of lane keeping assistance resumes, command modulate 230 may enable lane keeping assistance if it was previously enabled.

In addition to evaluating the number of peaks in a lateral motion signal as described above, command module 230 may also compute the cross correlation of the yaw acceleration and lateral acceleration of vehicle 100 within a pre-determined period of time. In some embodiments, if the cross correlation satisfies a criterion (e.g., less than −0.4) and the number of peaks counter satisfies a criterion as described above (e.g., more than 3 within 1.5s), then command module 230 may determine that a trailer sway event is in progress. In such an embodiment, even if only one or the other criterion is satisfied, command module 230 may nonetheless disable lane keeping assistance. In this manner, the vehicle operator may respond to disabling of lane keeping assistance based on criterion being satisfied, but prior to both criterions being satisfied should that occur. Such an approach may be desirable for instance where command module 230 takes additional response actions (e.g., disabling ADAS in part or entirely, implementing emergency corrective actions) when a trailer sway event is determined to be in progress.

When lane keeping assistance is disabled, command module 230 may generate an alert to warn the vehicle operator. For example, the alert may instruct vehicle 100 to generate audio, visual, or haptic feedback to warn the vehicle operator that lane keeping assistance has been disabled, that trailer sway has been detected, or a combination of both. The alert may also contain instructions as to additional messages to be provided to the vehicle operator, such as how to handle vehicle 100 (e.g., slow down, apply trailer brake, gradual control inputs only). In some embodiments, the alert may include instructions affecting the control of vehicle 100 (e.g., limit acceleration, limit lateral movement, limit braking, apply braking). In some embodiments, the alert may also contain instructions for notifying other vehicle operators, vehicles, or other entities that a potential or actual danger from trailer sway exists. For example, the alert may instruct vehicle 100 to turn on hazard lights, honk the horn, send a message to neighboring vehicles that a trailer sway event is in progress or to move away from vehicle 100, and so on. In some embodiments, command module 230 may provide instructions on how to alleviate trailer sway (e.g., maintain speed below 40 mph, redistribute trailer weight, check tire pressure).

Figure 5:
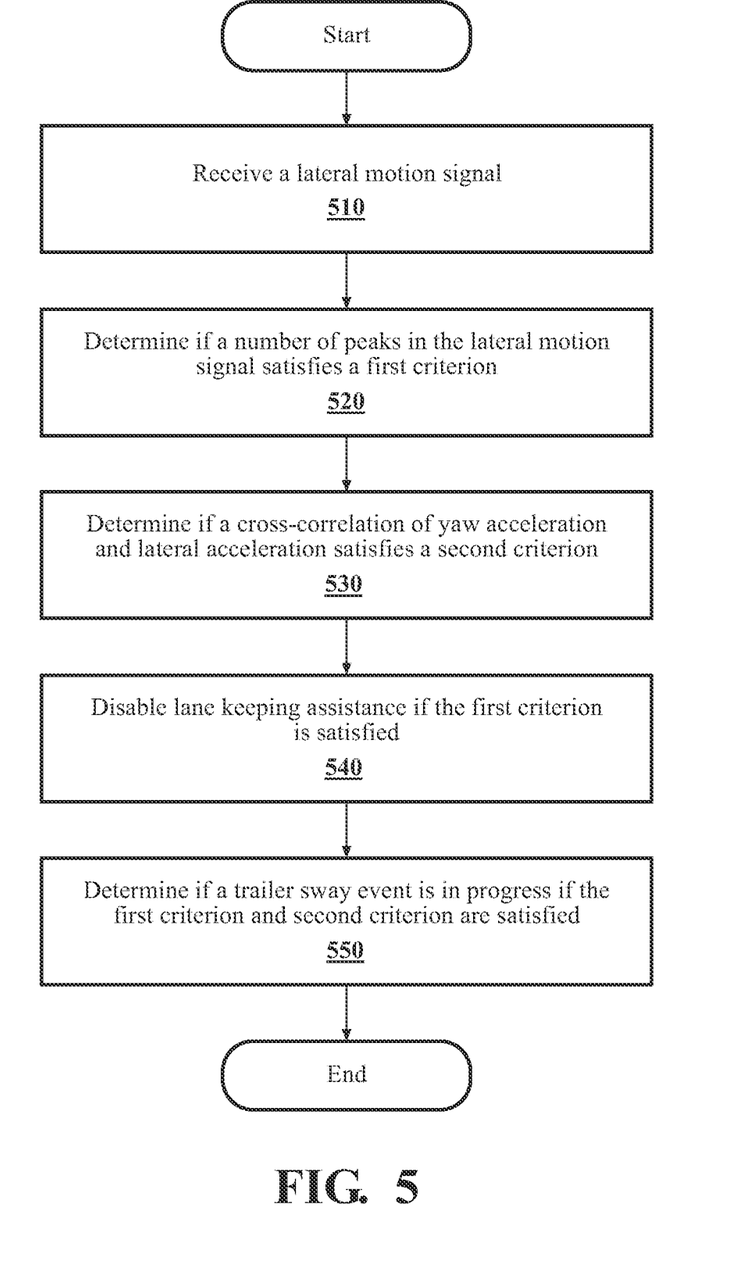
FIG. 5 illustrates one example of a method for implementing trailer sway detection strategies.

FIG. 5 illustrates a flowchart of a method 500 that is associated with implementing trailer sway detection strategies. Method 500 will be discussed from the perspective of the trailer sway detection system 170 of FIGS. 1 and 2. While method 500 is discussed in combination with the trailer sway detection system 170, it should be appreciated that the method 500 is not limited to being implemented within trailer sway detection system 170 but is instead one example of a system that may implement method 500.

At 510, command module 230 may receive a lateral motion signal from sensor data 250 for vehicle 100, such as a bandpass filtered lateral motion signal.

At 520, command module 230 may determine if a number of peaks in the lateral motion signal satisfies a first criterion. For example, command module 230 may determine the presence of a peak if it is above a pre-determined magnitude, then count the number of peaks that occur within a pre-determined time period (e.g., 1.5s) to determine if they satisfy a first criterion (e.g., 3 peaks within 1.5 s).

At 530, command module 230 may determine if a cross-correlation of yaw acceleration and lateral acceleration satisfies a second criterion. For example, command module 230 may receive yaw acceleration and lateral acceleration data from sensor data 250 for vehicle 100 and compute a cross-correlation for a pre-determined time period (e.g., 1.5s), which may then be evaluated to determine if it satisfies a second criterion (e.g., less than −0.4).

At 540, command module 230 may disable lane keeping assistance if the first criterion is satisfied. In some embodiments, command module 230 may disable lane keeping assistance if the second criterion is satisfied. When lane keeping assistance is disabled, command module 230 may generate an alert to warn the vehicle operator that lane keeping assistance has been disabled.

At 550, command module 230 may determine if a trailer sway event is in progress if the first criterion and second criterion are satisfied. When a trailer sway event is in progress, command module 230 may generate an alert to warn the vehicle operator that a trailer sway event is occurring.

FIG. 1 will now be discussed in full detail as an example environment within which the system and methods disclosed herein may operate. In some instances, vehicle 100 is configured to switch selectively between various modes, such as an autonomous mode, one or more semi-autonomous operational modes, a manual mode, etc. Such switching may be implemented in a suitable manner, now known, or later developed. "Manual mode" means that all of or a majority of the navigation/maneuvering of the vehicle is performed according to inputs received from a user (e.g., human driver). In one or more arrangements, vehicle 100 may be a conventional vehicle that is configured to operate in only a manual mode.

In one or more embodiments, vehicle 100 is an autonomous vehicle. As used herein, "autonomous vehicle" refers to a vehicle that operates in an autonomous mode. "Autonomous mode" refers to using one or more computing systems to control vehicle 100, such as providing navigation/maneuvering of vehicle 100 along a travel route, with minimal or no input from a human driver. In one or more embodiments, vehicle 100 is either highly automated or completely automated. In one embodiment, vehicle 100 is configured with one or more semi-autonomous operational modes in which one or more computing systems perform a portion of the navigation/maneuvering of the vehicle along a travel route, and a vehicle operator (i.e., driver) provides inputs to the vehicle to perform a portion of the navigation/maneuvering of vehicle 100 along a travel route.

Vehicle 100 may include one or more processors 110. In one or more arrangements, processor(s) 110 may be a main processor of vehicle 100. For instance, processor(s) 110 may be an electronic control unit (ECU). Vehicle 100 may include one or more data stores 115 for storing one or more types of data. Data store(s) 115 may include volatile memory, non-volatile memory, or both. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. Data store(s) 115 may be a component of processor(s) 110, or data store 115 may be operatively connected to processor(s) 110 for use thereby. The term "operatively connected," as used throughout this description, may include direct or indirect connections, including connections without direct physical contact.

In one or more arrangements, data store(s) 115 may include map data 116. Map data 116 may include maps of one or more geographic areas. In some instances, map data 116 may include information or data on roads, traffic control devices, road markings, structures, features, landmarks, or any combination thereof in the one or more geographic areas. Map data 116 may be in any suitable form. In some instances, map data 116 may include aerial views of an area. In some instances, map data 116 may include ground views of an area, including 360-degree ground views. Map data 116 may include measurements, dimensions, distances, information, or any combination thereof for one or more items included in map data 116. Map data 116 may also include measurements, dimensions, distances, information, or any combination thereof relative to other items included in map data 116. Map data 116 may include a digital map with information about road geometry. Map data 116 may be high quality, highly detailed, or both.

In one or more arrangements, map data 116 may include one or more terrain maps 117. Terrain map(s) 117 may include information about the ground, terrain, roads, surfaces, other features, or any combination thereof of one or more geographic areas. Terrain map(s) 117 may include elevation data in the one or more geographic areas. Terrain map(s) 117 may be high quality, highly detailed, or both. Terrain map(s) 117 may define one or more ground surfaces, which may include paved roads, unpaved roads, land, and other things that define a ground surface.

In one or more arrangements, map data 116 may include one or more static obstacle maps 118. Static obstacle map(s) 118 may include information about one or more static obstacles located within one or more geographic areas. A "static obstacle" is a physical object whose position does not change or substantially change over a period of time and whose size does not change or substantially change over a period of time. Examples of static obstacles include trees, buildings, curbs, fences, railings, medians, utility poles, statues, monuments, signs, benches, furniture, mailboxes, large rocks, hills. The static obstacles may be objects that extend above ground level. The one or more static obstacles included in static obstacle map(s) 118 may have location data, size data, dimension data, material data, other data, or any combination thereof, associated with it. Static obstacle map(s) 118 may include measurements, dimensions, distances, information, or any combination thereof for one or more static obstacles. Static obstacle map(s) 118 may be high quality, highly detailed, or both. Static obstacle map(s) 118 may be updated to reflect changes within a mapped area.

Data store(s) 115 may include sensor data 119. In this context, "sensor data" means any information about the sensors that vehicle 100 is equipped with, including the capabilities and other information about such sensors. As will be explained below, vehicle 100 may include sensor system 120. Sensor data 119 may relate to one or more sensors of sensor system 120. As an example, in one or more arrangements, sensor data 119 may include information on one or more LIDAR sensors 124 of sensor system 120.

In some instances, at least a portion of map data 116 or sensor data 119 may be located in data stores(s) 115 located onboard vehicle 100. Alternatively, or in addition, at least a portion of map data 116 or sensor data 119 may be located in data stores(s) 115 that are located remotely from vehicle 100.

As noted above, vehicle 100 may include sensor system 120. Sensor system 120 may include one or more sensors. "Sensor" means any device, component, or system that may detect or sense something. The one or more sensors may be configured to sense, detect, or perform both in real-time. As used herein, the term "real-time" means a level of processing responsiveness that a user or system senses as sufficiently immediate for a particular process or determination to be made, or that enables the processor to keep up with some external process.

In arrangements in which sensor system 120 includes a plurality of sensors, the sensors may work independently from each other. Alternatively, two or more of the sensors may work in combination with each other. In such an embodiment, the two or more sensors may form a sensor network. Sensor system 120, the one or more sensors, or both may be operatively connected to processor(s) 110, data store(s) 115, another element of vehicle 100 (including any of the elements shown in FIG. 1), or any combination thereof. Sensor system 120 may acquire data of at least a portion of the external environment of vehicle 100 (e.g., nearby vehicles).

Sensor system 120 may include any suitable type of sensor. Various examples of different types of sensors will be described herein. However, it will be understood that the embodiments are not limited to the particular sensors described. Sensor system 120 may include one or more vehicle sensors 121. Vehicle sensor(s) 121 may detect, determine, sense, or acquire in a combination thereof information about vehicle 100 itself. In one or more arrangements, vehicle sensor(s) 121 may be configured to detect, sense, or acquire in a combination thereof position and orientation changes of vehicle 100, such as, for example, based on inertial acceleration. In one or more arrangements, vehicle sensor(s) 121 may include one or more accelerometers, one or more gyroscopes, an inertial measurement unit (IMU), a dead-reckoning system, a global navigation satellite system (GNSS), a global positioning system (GPS), a navigation system 147, other suitable sensors, or any combination thereof. Vehicle sensor(s) 121 may be configured to detect, sense, or acquire in a combination thereof one or more characteristics of vehicle 100. In one or more arrangements, vehicle sensor(s) 121 may include a speedometer to determine a current speed of vehicle 100.

Alternatively, or in addition, sensor system 120 may include one or more environment sensors 122 configured to acquire, sense, or acquire in a combination thereof driving environment data. "Driving environment data" includes data or information about the external environment in which an autonomous vehicle is located or one or more portions thereof. For example, environment sensor(s) 122 may be configured to detect, quantify, sense, or acquire in any combination thereof obstacles in at least a portion of the external environment of vehicle 100, information/data about such obstacles, or a combination thereof. Such obstacles may be comprised of stationary objects, dynamic objects, or a combination thereof. Environment sensor(s) 122 may be configured to detect, measure, quantify, sense, or acquire in any combination thereof other things in the external environment of vehicle 100, such as, for example, lane markers, signs, traffic lights, traffic signs, lane lines, crosswalks, curbs proximate to vehicle 100, off-road objects, etc.

Various examples of sensors of sensor system 120 will be described herein. The example sensors may be part of the one or more environment sensor(s) 122, the one or more vehicle sensors 121, or both. However, it will be understood that the embodiments are not limited to the particular sensors described.

As an example, in one or more arrangements, sensor system 120 may include one or more radar sensors 123, one or more LIDAR sensors 124, one or more sonar sensors 125, one or more cameras 126, or any combination thereof. In one or more arrangements, camera(s) 126 may be high dynamic range (HDR) cameras or infrared (IR) cameras.

Vehicle 100 may include an input system 130. An "input system" includes any device, component, system, element or arrangement or groups thereof that enable information/data to be entered into a machine. Input system 130 may receive an input from a vehicle occupant (e.g., a driver or a passenger). Vehicle 100 may include an output system 135. An "output system" includes any device, component, or arrangement or groups thereof that enable information/data to be presented to a vehicle occupant (e.g., a driver, a vehicle passenger, etc.).

Vehicle 100 may include one or more vehicle systems 140. Various examples of vehicle system(s) 140 are shown in FIG. 1. However, vehicle 100 may include more, fewer, or different vehicle systems. It should be appreciated that although particular vehicle systems are separately defined, each or any of the systems or portions thereof may be otherwise combined or segregated via hardware, software, or a combination thereof within vehicle 100. Vehicle 100 may include a propulsion system 141, a braking system 142, a steering system 143, throttle system 144, a transmission system 145, a signaling system 146, a navigation system 147, other systems, or any combination thereof. Each of these systems may include one or more devices, components, or combinations thereof, now known or later developed.

Navigation system 147 may include one or more devices, applications, or combinations thereof, now known or later developed, configured to determine the geographic location of the vehicle 100, to determine a travel route for vehicle 100, or to determine both. Navigation system 147 may include one or more mapping applications to determine a travel route for vehicle 100. Navigation system 147 may include a global positioning system, a local positioning system, a geolocation system, or any combination thereof.

Processor(s) 110, trailer sway detection system 170, automated driving module(s) 160, or any combination thereof may be operatively connected to communicate with various aspects of vehicle system(s) 140 or individual components thereof. For example, returning to FIG. 1, processor(s) 110, automated driving module(s) 160, or a combination thereof may be in communication to send or receive information from various aspects of vehicle system(s) 140 to control the movement, speed, maneuvering, heading, direction, etc. of vehicle 100. Processor(s) 110, trailer sway detection system 170, automated driving module(s) 160, or any combination thereof may control some or all of these vehicle system(s) 140 and, thus, may be partially or fully autonomous.

Processor(s) 110, trailer sway detection system 170, automated driving module(s) 160, or any combination thereof may be operable to control at least one of the navigation or maneuvering of vehicle 100 by controlling one or more of vehicle systems 140 or components thereof. For instance, when operating in an autonomous mode, processor(s) 110, trailer sway detection system 170, automated driving module(s) 160, or any combination thereof may control the direction, speed, or both of vehicle 100. Processor(s) 110, trailer sway detection system 170, automated driving module(s) 160, or any combination thereof may cause vehicle 100 to accelerate (e.g., by increasing the supply of fuel provided to the engine), decelerate (e.g., by decreasing the supply of fuel to the engine, by applying brakes), change direction (e.g., by turning the front two wheels), or perform any combination thereof. As used herein, "cause" or "causing" means to make, force, compel, direct, command, instruct, enable, or in any combination thereof an event or action to occur or at least be in a state where such event or action may occur, either in a direct or indirect manner.

Vehicle 100 may include one or more actuators 150. Actuator(s) 150 may be any element or combination of elements operable to modify, adjust, alter, or in any combination thereof one or more of vehicle systems 140 or components thereof to responsive to receiving signals or other inputs from processor(s) 110, automated driving module(s) 160, or a combination thereof. Any suitable actuator may be used. For instance, actuator(s) 150 may include motors, pneumatic actuators, hydraulic pistons, relays, solenoids, and piezoelectric actuators, just to name a few possibilities.

Vehicle 100 may include one or more modules, at least some of which are described herein. The modules may be implemented as computer-readable program code that, when executed by processor(s) 110, implement one or more of the various processes described herein. One or more of the modules may be a component of processor(s) 110, or one or more of the modules may be executed on or distributed among other processing systems to which processor(s) 110 is operatively connected. The modules may include instructions (e.g., program logic) executable by processor(s) 110. Alternatively, or in addition, data store(s) 115 may contain such instructions.

In one or more arrangements, one or more of the modules described herein may include artificial or computational intelligence elements, e.g., neural network, fuzzy logic, or other machine learning algorithms. Further, in one or more arrangements, one or more of the modules may be distributed among a plurality of the modules described herein. In one or more arrangements, two or more of the modules described herein may be combined into a single module.

Vehicle 100 may include one or more autonomous driving modules 160. Automated driving module(s) 160 may be configured to receive data from sensor system 120 or any other type of system capable of capturing information relating to vehicle 100, the external environment of the vehicle 100, or a combination thereof. In one or more arrangements, automated driving module(s) 160 may use such data to generate one or more driving scene models. Automated driving module(s) 160 may determine position and velocity of vehicle 100. Automated driving module(s) 160 may determine the location of obstacles, obstacles, or other environmental features including traffic signs, trees, shrubs, neighboring vehicles, pedestrians, etc.

Automated driving module(s) 160 may be configured to receive, determine, or in a combination thereof location information for obstacles within the external environment of vehicle 100, which may be used by processor(s) 110, one or more of the modules described herein, or any combination thereof to estimate: a position or orientation of vehicle 100; a vehicle position or orientation in global coordinates based on signals from a plurality of satellites or other geolocation systems; or any other data/signals that could be used to determine a position or orientation of vehicle 100 with respect to its environment for use in either creating a map or determining the position of vehicle 100 in respect to map data.

Automated driving module(s) 160 either independently or in combination with trailer sway detection system 170 may be configured to determine travel path(s), current autonomous driving maneuvers for vehicle 100, future autonomous driving maneuvers, modifications to current autonomous driving maneuvers, etc. Such determinations by automated driving module(s) 160 may be based on data acquired by sensor system 120, driving scene models, data from any other suitable source such as determinations from sensor data 250, or any combination thereof. In general, automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of vehicle 100, changing travel lanes, merging into a travel lane, and reversing, just to name a few possibilities. Automated driving module(s) 160 may be configured to implement driving maneuvers. Automated driving module(s) 160 may cause, directly or indirectly, such autonomous driving maneuvers to be implemented. As used herein, "cause" or "causing" means to make, command, instruct, enable, or in any combination thereof an event or action to occur or at least be in a state where such event or action may occur, either in a direct or indirect manner. Automated driving module(s) 160 may be configured to execute various vehicle functions, whether individually or in combination, to transmit data to, receive data from, interact with, or to control vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, or processes described above may be realized in hardware or a combination of hardware and software and may be realized in a centralized fashion in one processing system or in a distributed fashion where different elements are spread across several interconnected processing systems. Any kind of processing system or another apparatus adapted for carrying out the methods described herein is suited. A typical combination of hardware and software may be a processing system with computer-usable program code that, when being loaded and executed, controls the processing system such that it carries out the methods described herein. The systems, components, or processes also may be embedded in a computer-readable storage, such as a computer program product or other data programs storage device, readable by a machine, tangibly embodying a program of instructions executable by the machine to perform methods and processes described herein. These elements also may be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein may be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory communicably coupled to the processor and storing machine-readable instructions that, when executed by the processor, cause the processor to:
receive a lateral motion signal;
determine if a number of peaks in the lateral motion signal satisfies a first criterion;
determine if a cross-correlation of yaw acceleration and lateral acceleration satisfies a second criterion;
disable lane keeping assistance if the first criterion is satisfied; and
determine if a trailer sway event is in progress if the first criterion and second criterion are satisfied.

2. The system of claim 1, wherein the first criterion is that the number of peaks within a time period is above a first threshold.

3. The system of claim 1, wherein the second criterion is that the cross-correlation is below a second threshold.

4. The system of claim 1, wherein the machine-readable instructions further includes an instruction to:
    generate an alert that the lane keeping assistance has been disabled.

5. The system of claim 1, wherein the machine-readable instructions further includes an instruction to:
    generate an alert of a trailer sway event if it is determined that the trailer sway event is in progress.

6. The system of claim 5, wherein the machine-readable instruction to generate the alert of a trailer sway event further includes instructions to flash vehicle lights, honk a horn, or send a warning message to another vehicle.

7. The system of claim 1, wherein the machine-readable instructions further includes instructions to:
    Disallow the lane keeping assistance to be enabled for a time period after the first criterion is no longer satisfied.

8. A non-transitory computer-readable medium including instructions that when executed by one or more processors cause the one or more processors to:
    receive a lateral motion signal;
    determine if a number of peaks in the lateral motion signal satisfies a first criterion;
    determine if a cross-correlation of yaw acceleration and lateral acceleration satisfies a second criterion;
    disable lane keeping assistance if the first criterion is satisfied; and
    determine if a trailer sway event is in progress if the first criterion and second criterion are satisfied.

9. The non-transitory computer-readable medium of claim 8, wherein the first criterion is that the number of peaks within a time period is above a first threshold.

10. The non-transitory computer-readable medium of claim 8, wherein the second criterion is that the cross-correlation is below a second threshold.

11. The non-transitory computer-readable medium of claim 8, wherein the instructions further includes an instruction to:
    generate an alert that the lane keeping assistance has been disabled.

12. The non-transitory computer-readable medium of claim 8, wherein the instructions further includes an instruction to:
    generate an alert of a trailer sway event if it is determined that the trailer sway event is in progress.

13. The non-transitory computer-readable medium of claim 12, wherein the instructions to generate the alert of a trailer sway event further includes instructions to flash vehicle lights, honk a horn, or send a warning message to another vehicle.

14. A method, comprising:
    receiving a lateral motion signal;
    determining if a number of peaks in the lateral motion signal satisfies a first criterion;
    determining if a cross-correlation of yaw acceleration and lateral acceleration satisfies a second criterion;
    disabling lane keeping assistance if the first criterion is satisfied; and
    determining if a trailer sway event is in progress if the first criterion and second criterion are satisfied.

15. The method of claim 14, wherein the first criterion is that the number of peaks within a time period is above a first threshold.

16. The method of claim 14, wherein the second criterion is that the cross-correlation is below a second threshold.

17. The method of claim 14, further comprising:
    generating an alert that the lane keeping assistance has been disabled.

18. The method of claim 14, further comprising:
    generating an alert of a trailer sway event if it is determined that the trailer sway event is in progress.

19. The method of claim 18, wherein generating the alert of a trailer sway event further includes at least one of flashing vehicle lights, honking a horn, or sending a warning message to another vehicle.

20. The method of claim 14, further comprising:
    disallowing the lane keeping assistance to be enabled for a time period after the first criterion is no longer satisfied.

* * * * *